United States Patent [19]
Porret

[11] 3,943,109
[45] Mar. 9, 1976

[54] DIGLYCIDYLBENZIMIDIAZOLONES
[75] Inventor: Daniel Porret, Binningen, Switzerland
[73] Assignee: Ciba-Geigy Corporation, Ardsley, N.Y.
[22] Filed: June 24, 1974
[21] Appl. No.: 482,057

Related U.S. Application Data
[62] Division of Ser. No. 319,268, Dec. 29, 1972, Pat. No. 3,843,674.

[52] U.S. Cl......... 260/77.5 C; 260/2 EP; 260/2 EC; 260/2 N; 260/2 EA
[51] Int. Cl.²......................................... C08G 59/26
[58] Field of Search..... 260/2 EP, 2 EC, 2 EA, 2 N, 260/77.5 C

[56] References Cited
UNITED STATES PATENTS

| 3,429,833 | 2/1969 | Porret | 260/2 |
| 3,449,353 | 6/1969 | Porret et al. | 260/309.5 |
| 3,495,255 | 2/1970 | George | 260/2 |
| 3,629,263 | 12/1971 | Batzer et al. | 260/257 |
| 3,787,405 | 1/1974 | Porret et al. | 260/260 |
| 3,828,045 | 8/1974 | Batzer et al. | 260/260 |
| 3,828,066 | 8/1924 | Porret | 260/309.6 |

Primary Examiner—Donald E. Czaja
Assistant Examiner—E. A. Nielsen
Attorney, Agent, or Firm—Vincent J. Cavalieri

[57] ABSTRACT

New, substituted and/or fused diglycidylbenzimidazolones which can be used, by curing with amines or anhydrides, for the manufacture of casting resins, electrical resins, sintering powders and compression moulding compositions.

3 Claims, No Drawings

NEW DIGLYCIDYLBENZIMIDAZOLONES

This is a Divisional of application Ser. No. 319,268, filed on Dec. 29, 1972 now U.S. Pat. No. 3,843,674, issued Oct. 22, 1974.

The subject of the invention are new, substituted and/or fused diglycidylbenzimidazolones which can be used, by curing with amines or anhydrides, for the manufacture of casting resins, electrical resins, sintering powders, compression moulding compositions, B-stages and the like.

Diglycidylimidazolidones based on ethyleneurea or propyleneurea are already known from Swiss Patent specification 471,149.

Further, diglycidylbenzimidazolone has been described in the Russian Patent specification 271,005. There, attention is also drawn to the exceptional compressive strength of the cured resins.

The diglycidylbenzimidazolones according to the invention, which can be manufactured easily and in high purity, lead to cured products which are more stable to water. They correspond to the formula (I)

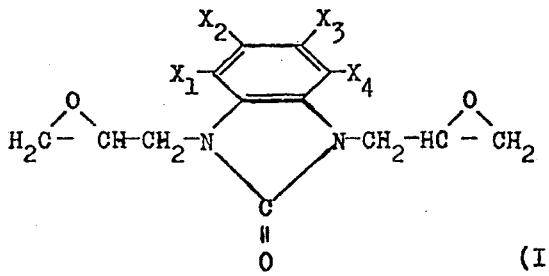

wherein at least one X from amongst $X_1$, $X_2$, $X_3$ and $X_4$ denotes an alkyl group with 1 to 4 carbon atoms or halogen or two adjacent X together represent a fused benzene radical and the remaining X denote hydrogen.

Preferably, one X denotes the methyl group and the remaining X denote hydrogen atoms, or $X_1$ and $X_2$ together form a fused benzene ring.

The diglycidyl ethers of the formula (I) can be manufactured from compounds of the formula (II)

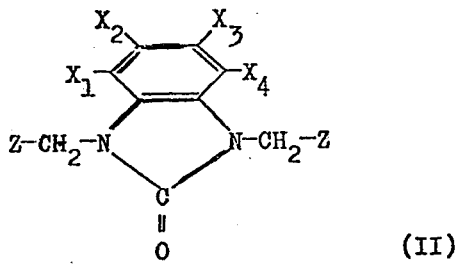

in which Z denotes a radical which can be converted into a 1,2-epoxyethyl group, by converting the groups Z in a known manner into epoxyethyl groups. Z in particular denotes a 1-hydroxy-2-halogenoethyl or 1-halogeno-2-hydroxyethyl group, with chlorine or bromine being employed as halogen. The reaction takes place in the customary manner, above all in the presence of agents which split off hydrogen halide, such as strong alkalis, for example anhydrous sodium hydroxide or aqueous sodium hydroxide solution. However, other strongly alkaline reagents, such as potassium hydroxide, barium hydroxide, calcium hydroxide, sodium carbonate or potassium carbonate can also be used for the purpose.

A further radical Z which can be converted into the 1,2-epoxyethyl radical is, for example, the ethylene radical which can be converted into the 1,2-epoxyethyl radical in a known manner, such as, above all, by reaction with hydrogen peroxide or per-acids, for example peracetic, perbenzoic or monoperphthalic acid.

The starting substances of the formula (II) are obtained in a manner which is in itself known. Thus, one mol of a substituted or fused benzimidazolone is reacted with 2 mols of an epihalogenohydrin, above all epichlorohydrin, in the presence of a catalyst such as, in particular, a tertiary amine, a quaternary ammonium base or a quaternary ammonium salt. Suitable catalysts for the addition of epichlorohydrin are above all tertiary amines, such as triethylamine, tri-n-propylamine, benzyldimethylamine, N,N'-dimethylaniline and triethanolamine; quaternary ammonium bases, such as benzyltrimethylammonium hydroxide; quaternary ammonium salts, such as tetramethylammonium chloride, tetraethylammonium chloride, benzyltrimethylammonium chloride, benzyltrimethylammonium acetate and methyltriethylammonium chloride; hydrazines with a tertiary nitrogen atom, such as 1,1-dimethylhydrazine, which can also be employed in a quaternised form; alkali halides such as lithium chloride, potassium chloride or sodium chloride, bromide or fluoride; also, ion exchange resins with tertiary or quaternary amino groups as well as ion exchangers with acid amide groups. It is also possible to work without a catalyst.

The addition of the epihalogenohydrin to the substituted or fused benzimidazolone can be carried out with or without solvent, with an excess of epichlorohydrin, at temperatures up to 140°C, under the action of one of the catalysts mentioned, in 30 to 360 minutes. The subsequent dehydrohalogenation can be carried out at 40° to 70°C with solid or liquid alkalis and optionally whilst azeotropically distilling off the water formed. The alkali halide is separated off in a known manner. The resulting diglycidyl derivatives are isolated by distilling off the excess epihalogenohydrin and, if appropriate, the solvent. They are as a rule obtained as crude crystals in yields of up to 100 percent.

The substituted or fused benzimidazolones can be manufactured in a known manner by condensing appropriately substituted or fused o-phenylenediamines with phosgene.

The diglycidyl compounds according to the invention of the formula (I) react with the customary curing agents for epoxide compounds. They can therefore be crosslinked or cured by addition of such curing agents, analogously to other polyfunctional epoxide compounds. Basic or acid compounds can be used as such curing agents.

As suitable curing agents there may, for example, be mentioned: amines or amides, such as aliphatic, cycloaliphatic or aromatic, primary, secondary and tertiary amines, for example monoethanolamine, ethylenediamine, hexamethylenediamine, trimethylhexamethylenediamine, diethylenetriamine, triethylenetetramine, tetraethylenepentamine, N,N-dimethylpropylenediamine-1,3, N,N-diethylpropylenediamine-1,3, 2,2-bis-(4'-aminocyclohexyl)propane, 3,5,5-trimethyl-3(aminomethyl)-cyclohexylamine ("isophoronediamine"), Mannich bases, such as 2,4,6- tris-(dimethylaminomethyl)-phenol; m-phenylenediamine, p-phenylenediamine, bis-(4-aminophenyl)-methane, bis-(4-aminophenyl)-sulphone and m-xylylenediamine; adducts of acrylonitrile or monoepoxides, such as ethylene oxide or propylene oxide, to polyalkylenepolyamines, such as diethylenetriamine or triethylenetetramine; adducts of polyamines, such as diethylenetriamine or triethylenetetramine in excess, and polyepoxides, such as diomethane-polyglycidylethers; ketimines, for example from acetone or methyl ethyl ketone and bis(p-aminophenyl)-methane; adducts of monophenols or polyphenols and polyamines; polyamides, especially those from aliphatic polyamines, such as diethylenetriamine or triethylenetetramine, and dimerised or trimerised unsaturated fatty acids, such as dimerised linseed oil fatty acid (VERSAMID); polymeric polysulphides (THIOKOL); dicyandiamide, aniline-formaldehyde resins; polyhydric phenols, for example resorcinol, 2,2-bis-(4-hydroxyphenyl)-propane or phenol-formaldehyde resins; boron trifluoride and its complexes with organic compounds, such as $BF_3$-ether complexes and $BF_3$-amine complexes, for example $BF_3$-monoethylamine complex; acetoacetanilide-$BF_3$ complex; phosphoric acid; triphenylphosphite; polybasic carboxylic acids and their anhydrides, for example phthalic anhydride, $\Delta^4$-tetrahydrophthalic anhydride, hexahydrophthalic anhydride, 4-methylhexahydrophthalic anhydride, 3,6-endomethylene-$\Delta^4$-tetrahydrophthalic anhydride, 4-methyl-3,6-endomethylene-$\Delta^4$-tetrahydrophthalic anhydride (= methylnadic anhydride), 3,4,5,6,7,7-hexachloro-3,6-endomethylene-$\Delta^4$-tetrahydrophthalic anhydride, succinic anhydride, adipic anhydride, trimethyl adipic anhydride, azelaic anhydride, sebacic anhydride, maleic anhydride, dodecenyl-succinic anhydride; pyromellitic dianhydride or mixtures of such anhydrides.

Curing accelerators can furthermore be employed in the curing reaction, and in particular when using polyamides, dicyandiamide, polymeric polysulphides or polycarboxylic acid anhydrides as curing agents; such accelerators are, for example, tertiary amines, their salts or quaternary ammonium compounds, for example 2,4,6-tris-(dimethylaminomethyl)phenol, benzyldimethylamine, 2-ethyl-4-methyl-imidazole and triamylammonium phenolate; or alkali metal alcoholates, such as, for example, sodium hexanetriolate.

A further subject of the invention are curable mixtures which contain a diglycidyl compound according to the invention, of the formula (I), optionally together with other polyepoxide compounds, and also curing agents for epoxide resins, such as polyamines or polycarboxylic acid anhydrides.

The diglycidyl compounds according to the invention or their mixtures with other polyepoxide compounds and/or curing agents can be mixed, before curing, with customary modifiers, such as extenders, fillers and reinforcing agents, pigments, dyestuffs, plasticisers, flow control agents, agents for conferring thixotropy, flameproofing substances and mould release agents.

As extenders, reinforcing agents, fillers and pigments which can be introduced into the curable mixtures according to the invention there may, for example, be mentioned: coal tar, bitumen, glass fibres, boron fibres, carbon fibres, cellulose, polyethylene powder, polypropylene powder, mica, asbestos, quartz powder, slate powder, aluminium oxide trihydrate, chalk powder, gypsum, antimony trioxide, bentones, silica aerogel (AEROSIL), lithopone, baryte, titanium dioxide, carbon black, graphite, iron oxide or metal powders, such as aluminium powder or iron powder.

Suitable organic solvents for modifying the curable mixtures are, for example, toluene, xylene, n-propanol, butyl acetate, acetone, methyl ethyl ketone, diacetone alcohol, ethylene glycol monomethyl ether, monoethyl ether and monobutyl ether.

Particularly for use in the lacquer field, the new diglycidyl compounds can furthermore be partially or completely esterified in a known manner with carboxylic acids such as, in particular, higher unsaturated fatty acids. It is furthermore possible to add other curable synthetic resins, for example phenoplasts or aminoplasts, to such lacquer resin formulations.

The curable mixtures can serve, in the unfilled or filled state, optionally in the form of solutions or emulsions, as laminating resins, paints, lacquers, dipping resins, impregnating resins, casting resins, compression moulding compositions, sintering powders, spreading and surface-filling compositions, floor covering compositions, potting and insulating compositions for the electrical industry, and adhesives, and for the manufacture of such products.

Cured mouldings of this resin display good heat stability good electrical properties and outstanding stability to water, coupled with good mechanical properties.

MANUFACTURING EXAMPLES

Example 1

25.8 g of 1,2-naphthylideneimidazolone (0.14 mol; melting point = 347°C) together with 388.5 g of epichlorohydrin (4.2 mols) and 0.5 g of tetramethylammonium chloride are stirred for 110 minutes at 115° – 118°C. A clear, dark solution thereby results. A sample taken from the batch and freed of volatile constituents (above all epichlorohydrin, dichlorohydrin and the like) then shows an epoxide content of 3.61 equivalents/kg (53.6 percent of theory). An azeotropic circulatory distillation is established by applying vacuum (60–90 mm Hg) at an external temperature of 140° – 148°C in such a way that at a temperature of the reaction mixture of 59°–61°C a vigorous distillation takes place. 24.6 g of 50 percent strength aqueous sodium hydroxide solution (0.308 mol) are then added dropwise over the course of 120 minutes with vigorous stirring; at the same time the water present in the reaction mixture is continuously removed azeotropically, and separated off.

Thereafter, distillation is continued for 30 minutes under the indicated conditions in order to remove the last remnants of water from the batch. The sodium chloride produced in the reaction is removed by filtration; the residue is washed with a little epichlorohydrin and the combined epichlorohydrin solutions are extracted by shaking with 50 ml of water to remove salt and remnants of alkali. The organic phase is concentrated at 60°C under a waterpump vacuum and is then dried to constant weight at 100°C/0.2 mm Hg. 38.5 g (93 percent of theory) of a dark, viscous resin are obtained. The epoxide content is 5.88 equivalents/kg (87 percent of theory). The product can be recrystallised by recrystallisation from acetone in the ratio of 1:1. A purified product is obtained in the form of a yellowish crystal powder which melts at 117°–119°C and has an epoxide content of 6.68 equivalents/kg. In agreement with the formula given below, the microanalysis gives the following values:

| Found: | Calculated: |
|---|---|
| 68.75% C | 68.90% C |
| 5.46% H | 5.44% H |
| 9.54% N | 9.45% N |

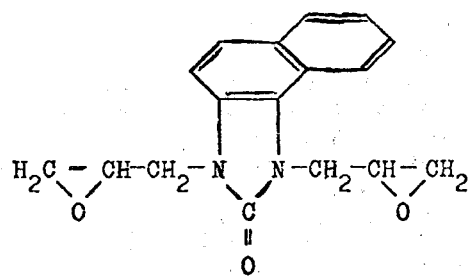

EXAMPLE 2

Analogously to Example 1, 118.5 g of 5-methyl-benzimidazolone (0.8 mol) are reacted with 1,480 g of epichlorohydrin (16.0 mols), using 1.5 g of tetramethylammonium chloride; the dehydrohalogenation is carried out with 140.8 g of 50 percent strength aqueous sodium hydroxide solution according to Example 1. The mixture is worked up as described above and 196.8 g (94.5 percent of theory) of a clear, dark, viscous resin, which gradually crystallises out, are obtained. The epoxide content is 7.39 equivalents/kg (96.3 percent of theory) and the total chlorine content is 1.0 percent.

For purification, 138 g of crude product are recrystallised from 200 g of isopropanol. A practically colourless crystal powder is obtained, which melts at 85°–88°C and has an epoxide content of 7.64 equivalents/kg (99.4 percent of theory). The microanalysis shows:

| Found: | Calculated: |
|---|---|
| 64.56% C | 64.60% C |
| 6.21% H | 6.20% H |
| 18.45% O | 18.44% O |
| 10.78% N | 10.76% N |

Accordingly, the new diglycidyl compound corresponds to the following structure:

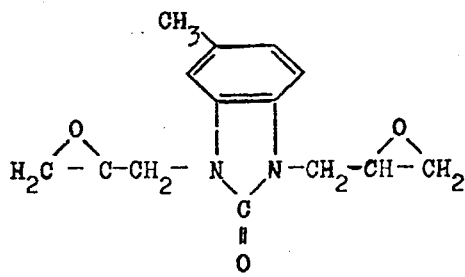

EXAMPLE 3

The following substances are reacted as described in Example 1: 48.6 g of 5,6-dimethylbenzimidazolone (0.3 mol), 555 g of epichlorohydrin (6.0 mols), 0.5 g of tetramethylammonium chloride and 52.8 g of 50 percent strength aqueous sodium hydroxide solution (0.66 mol). The conduct of the reaction, working up and isolation of the substances take place analogously to Example 1, and 85 g (theory 82.3 g) of brown crystals containing 6.74 epoxide equivalents/kg (92.5 percent of theory), and having a melting point of 120°–133°C and a total chlorine content of 3.3 percent are obtained as the crude product. Purification is effected by recrystallisation from acetone in the ratio of 1:3 and colourless crystals containing 7.05 epoxide equivalents/kg (96.8 percent of theory) and having a melting point of 140°–144°C are obtained in 56.2 percent yield.

The microanalysis gives the following values:

| Found: | Calculated: |
|---|---|
| 65.51% C | 65.67% C |
| 6.68% H | 6.61% H |
| 10.13% N | 10.21% N |

Accordingly, the new compound corresponds to the following structure:

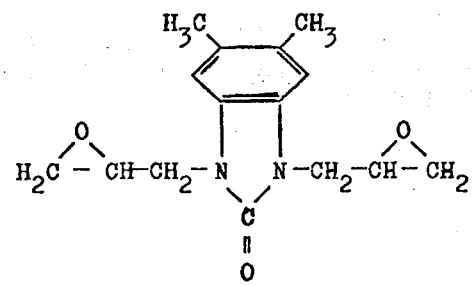

EXAMPLE 4

Following Example 1, 33.7 g of 5-chlorobenzimidazolidone (0.2 mol) are reacted with 555 g of epichlorohydrin (6.0 mols) with the aid of 1 g of tetramethylammonium chloride. The dehydrohalogenation takes place as described above with 35.2 g of 50 percent strength aqueous sodium hydroxide solution (0.44 mol). After the customary working up, 55 g of a brown crystal mass (98 percent of theory) containing 6.53 epoxide equivalents per kilogram (91.5 percent of theory) are obtained, the chlorine content being 13.82 percent (theory 12.63 percent).

For purification, the material is recrystallised from acetone in the ratio of 1:7. Practically colourless crystals melting at 135°–139°C are obtained; the epoxide content is 7.13 equivalents/kg (100 percent of theory). Analysis by combustion shows:

| Found: | Calculated: |
|---|---|
| 55.59% C | 55.62% C |
| 4.73% H | 4.67% H |
| 9.93% N | 9.98% N |
| 12.67% CL | 12.63% Cl |

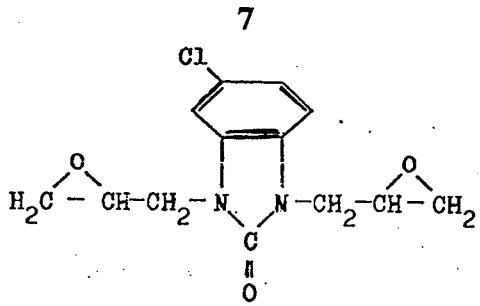

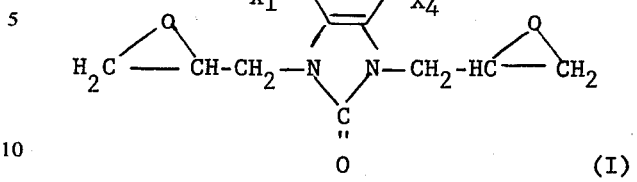

USE EXAMPLE 100 g of the purified diglycidyl compound manufactured according to Example 3 (7.64 epoxide equivalents/kg) are mixed with 111.8 g of hexahydrophthalic anhydride at 80°C and the mixture is de-aerated and poured into an aluminium casting mould prewarmed to 80°C. Curing takes place in 5 hours at 80°C + 2 hours at 120°C + 20 hours at 150°C. Clear, transparent mouldings having the following properties are obtained:

| | |
|---|---|
| Water absorption (4 days/20°C) | 0.38% |
| Heat distortion point according to Martens (DIN) | 123°C |
| Flexural strength (VSM 77,103) | 10.0–12.6 kp/mm² |
| Deflection (VSM 77,103) | 3.3–3.8 mm |

I claim:

1. A curable mixture which serves for the manufacture of moldings, consisting essentially of a diglycidyl compound of the formula in which at least one X from amongst $X_1$, $X_2$, $X_3$ and $X_4$ denotes alkyl with 1 to 4 carbon atoms or halogen or two adjacent X together represent a fused benzene radical and the remaining X denote hydrogen; and a curing agent for epoxy resins.

2. A curable mixture according to claim 1 characterized in that one of the radicals $X_1$, $X_2$, $X_3$ and $X_4$ denotes methyl, and the remainder denotes hydrogen.

3. The curable mixture of claim 1 wherein the diglycidyl compound has the formula

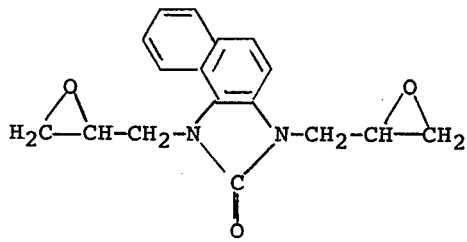

\* \* \* \* \*